US010247828B2

(12) United States Patent
Riley et al.

(10) Patent No.: US 10,247,828 B2
(45) Date of Patent: *Apr. 2, 2019

(54) POSITION DETERMINATION USING MEASUREMENTS FROM PAST AND PRESENT EPOCHS

(71) Applicant: QUALCOMM Incorporated, San Diego, CA (US)

(72) Inventors: Wyatt Thomas Riley, Chesterbrook, PA (US); Douglas Neal Rowitch, Honolulu, HI (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 766 days.

This patent is subject to a terminal disclaimer.

(21) Appl. No.: 14/255,800

(22) Filed: Apr. 17, 2014

(65) Prior Publication Data

US 2014/0225770 A1    Aug. 14, 2014

Related U.S. Application Data

(63) Continuation of application No. 12/792,548, filed on Jun. 2, 2010, now Pat. No. 8,704,707.

(51) Int. Cl.
| G01S 19/42 | (2010.01) |
| G01S 19/43 | (2010.01) |
| G01S 19/39 | (2010.01) |
| G01S 5/02 | (2010.01) |
| G01S 19/49 | (2010.01) |
| G01S 19/25 | (2010.01) |
| G01S 19/46 | (2010.01) |

(52) U.S. Cl.
CPC ............ *G01S 19/39* (2013.01); *G01S 5/0236* (2013.01); *G01S 19/258* (2013.01); *G01S 19/42* (2013.01); *G01S 19/46* (2013.01); *G01S 19/49* (2013.01)

(58) Field of Classification Search
CPC ...... G01S 19/39; G01S 5/0236; G01S 19/258; G01S 19/42; G01S 19/46; G01S 19/49; G01S 19/43; G01S 5/02; G01S 5/14; H04Q 7/38; H04Q 7/34; H04Q 7/20; H04W 24/00; H04M 1/66; H04M 3/42; G01C 21/20; G01C 21/00
USPC .................................................... 342/357.22
See application file for complete search history.

(56) References Cited

U.S. PATENT DOCUMENTS

| 5,452,211 A | 9/1995 | Kyrtsos et al. |
| 5,663,734 A | 9/1997 | Krasner |

(Continued)

FOREIGN PATENT DOCUMENTS

| BY | 6664 C1 | 12/2004 |
| CN | 1152356 A | 6/1997 |

(Continued)

OTHER PUBLICATIONS

European Search Report—EP15188297—Search Authority—Munich—Jan. 22, 2016.

(Continued)

*Primary Examiner* — Kwasi Karikari
(74) *Attorney, Agent, or Firm* — Bala Ramasamy; Kilpatrick Townsend & Stockton

(57) ABSTRACT

The subject matter disclosed herein relates to positioning systems and location determination using measurement stitching.

23 Claims, 4 Drawing Sheets

(56) References Cited

U.S. PATENT DOCUMENTS

| | | | |
|---|---|---|---|
| 5,774,829 A * | 6/1998 | Cisneros | G01S 5/145 342/457 |
| 5,862,511 A | 1/1999 | Croyle et al. | |
| 5,874,914 A | 2/1999 | Krasner | |
| 5,883,594 A * | 3/1999 | Lau | G01S 19/252 342/357.63 |
| 5,884,220 A | 3/1999 | Farmer et al. | |
| 5,983,159 A | 11/1999 | Schipper | |
| 5,999,124 A | 12/1999 | Sheynblat | |
| 6,016,119 A | 1/2000 | Krasner | |
| 6,055,477 A | 4/2000 | McBurney et al. | |
| 6,081,229 A | 6/2000 | Soliman et al. | |
| 6,104,340 A | 8/2000 | Krasner | |
| 6,246,960 B1 | 6/2001 | Lin | |
| 6,252,543 B1 | 6/2001 | Camp | |
| 6,252,545 B1 * | 6/2001 | Da | G01S 19/05 342/357.42 |
| 6,259,398 B1 | 7/2001 | Riley | |
| 6,285,316 B1 * | 9/2001 | Nir | G01S 1/68 342/357.46 |
| 6,295,024 B1 | 9/2001 | King et al. | |
| 6,424,914 B1 | 7/2002 | Lin | |
| 6,429,809 B1 * | 8/2002 | Vayanos | G01S 19/09 342/357.23 |
| 6,433,739 B1 | 8/2002 | Soliman | |
| 6,490,456 B1 | 12/2002 | Bogdan et al. | |
| 6,493,631 B1 | 12/2002 | Burns | |
| 6,535,833 B1 | 3/2003 | Syrjaerinne | |
| 6,570,530 B2 | 5/2003 | Gaal et al. | |
| 6,587,692 B1 | 7/2003 | Chen et al. | |
| 6,664,923 B1 | 12/2003 | Ford | |
| 6,735,523 B1 | 5/2004 | Lin et al. | |
| 6,778,136 B2 * | 8/2004 | Gronemeyer | G01S 19/235 342/357.69 |
| 6,975,266 B2 | 12/2005 | Abraham et al. | |
| 7,409,289 B2 | 8/2008 | Coatantiec et al. | |
| 7,580,381 B2 * | 8/2009 | Michelon | G01S 19/11 342/357.29 |
| 7,586,441 B2 | 9/2009 | Huang et al. | |
| 7,613,917 B1 | 11/2009 | Chojnacki | |
| 7,623,871 B2 | 11/2009 | Sheynblat | |
| 7,646,330 B2 | 1/2010 | Karr | |
| 7,660,588 B2 | 2/2010 | Sheynblat et al. | |
| 7,786,931 B2 * | 8/2010 | Monnerat | G01S 19/258 342/357.64 |
| 7,987,049 B2 | 7/2011 | Hayashi et al. | |
| 8,331,422 B2 * | 12/2012 | Weill | G01S 19/254 342/357.64 |
| 8,483,717 B2 * | 7/2013 | Sheynblat | G01S 5/02 455/456.1 |
| 8,614,641 B2 * | 12/2013 | Yule | G01S 5/0036 342/357.28 |
| 8,682,481 B2 * | 3/2014 | Toshima | G11B 17/225 271/152 |
| 8,682,581 B2 * | 3/2014 | Psiaki | G01C 21/28 342/357.2 |
| 8,704,707 B2 * | 4/2014 | Riley | G01S 5/0236 342/357.25 |
| 8,912,953 B2 * | 12/2014 | Jeong | G01S 19/42 342/357.28 |
| 9,074,897 B2 * | 7/2015 | Kulik | G01C 21/165 |
| 9,229,089 B2 * | 1/2016 | Do | G01C 21/20 |
| 2001/0020216 A1 | 9/2001 | Lin | |
| 2002/0015439 A1 | 2/2002 | Kohli et al. | |
| 2002/0032525 A1 | 3/2002 | Yoshikawa et al. | |
| 2002/0047799 A1 | 4/2002 | Gustafson et al. | |
| 2002/0089450 A1 | 7/2002 | Dowdle et al. | |
| 2002/0126044 A1 | 9/2002 | Gustafson et al. | |
| 2003/0132873 A1 | 7/2003 | Devereux et al. | |
| 2003/0146869 A1 | 8/2003 | Lin et al. | |
| 2003/0149528 A1 | 8/2003 | Lin | |
| 2004/0002344 A1 | 1/2004 | Moeglein et al. | |
| 2004/0025277 A1 | 2/2004 | Chen | |
| 2004/0145519 A1 | 7/2004 | Cho | |
| 2005/0090266 A1 * | 4/2005 | Sheynblat | G01S 5/02 455/456.1 |
| 2005/0162312 A1 | 7/2005 | Riday | |
| 2005/0192745 A1 | 9/2005 | Abraham et al. | |
| 2005/0203701 A1 | 9/2005 | Scherzinger | |
| 2005/0228589 A1 | 10/2005 | Diggelen et al. | |
| 2005/0288033 A1 | 12/2005 | McNew et al. | |
| 2006/0028377 A1 | 2/2006 | Abraham | |
| 2006/0071851 A1 | 4/2006 | Graas et al. | |
| 2006/0293853 A1 | 12/2006 | Chiou et al. | |
| 2007/0004430 A1 * | 1/2007 | Hyun | G01S 5/0236 455/456.1 |
| 2007/0016371 A1 | 1/2007 | Waid et al. | |
| 2007/0205941 A1 * | 9/2007 | Riley | G01S 19/25 342/357.29 |
| 2008/0032706 A1 | 2/2008 | Sheynblat et al. | |
| 2008/0071469 A1 | 3/2008 | Caveney | |
| 2008/0088507 A1 | 4/2008 | Smith et al. | |
| 2008/0091350 A1 | 4/2008 | Smith et al. | |
| 2008/0117100 A1 | 5/2008 | Wang et al. | |
| 2008/0262728 A1 | 10/2008 | Lokshin et al. | |
| 2008/0270026 A1 | 10/2008 | Han | |
| 2008/0279421 A1 | 11/2008 | Hamza et al. | |
| 2008/0284643 A1 | 11/2008 | Scherzinger et al. | |
| 2009/0093959 A1 | 4/2009 | Scherzinger et al. | |
| 2009/0287414 A1 | 11/2009 | Vickery | |
| 2009/0315772 A1 | 12/2009 | Wengler et al. | |
| 2009/0322598 A1 | 12/2009 | Fly et al. | |
| 2010/0099375 A1 | 4/2010 | Rowitch | |
| 2010/0117894 A1 | 5/2010 | Velde et al. | |
| 2010/0117897 A1 | 5/2010 | Riley et al. | |
| 2010/0194634 A1 | 8/2010 | Biacs et al. | |
| 2010/0312461 A1 | 12/2010 | Haynie et al. | |
| 2010/0318292 A1 | 12/2010 | Kulik et al. | |
| 2011/0148697 A1 | 6/2011 | Thiel et al. | |
| 2011/0163913 A1 | 7/2011 | Cohen et al. | |
| 2012/0032842 A1 | 2/2012 | Smith et al. | |
| 2012/0146847 A1 | 6/2012 | Janky et al. | |
| 2013/0344901 A1 | 12/2013 | Garin et al. | |
| 2014/0080514 A1 | 3/2014 | Das et al. | |

FOREIGN PATENT DOCUMENTS

| | | | |
|---|---|---|---|
| CN | 1312912 A | 9/2001 | |
| CN | 1425226 A | 6/2003 | |
| CN | 1893728 A | 1/2007 | |
| EP | 1203966 A2 * | 5/2002 | G01S 19/49 |
| EP | 1455198 A2 | 9/2004 | |
| EP | 1841256 A1 * | 10/2007 | G01S 5/02 |
| EP | 1841256 A1 * | 10/2007 | G01S 5/02 |
| JP | 1298820 A | 12/1989 | |
| JP | 10505723 | 6/1998 | |
| JP | 2000028699 A | 1/2000 | |
| JP | 2000184430 A | 6/2000 | |
| JP | 2001083227 A | 3/2001 | |
| JP | 2001177469 A | 6/2001 | |
| JP | 2001508250 A | 6/2001 | |
| JP | 2001305210 A | 10/2001 | |
| JP | 2003506690 A | 2/2003 | |
| JP | 2004519887 A | 7/2004 | |
| JP | 2004526149 A | 8/2004 | |
| JP | 2005517340 A | 6/2005 | |
| JP | 2005326225 A | 11/2005 | |
| JP | 2008506126 A | 2/2008 | |
| JP | 2011128156 A | 6/2011 | |
| KR | 20000007288 | 2/2000 | |
| KR | 20070021872 A | 2/2007 | |
| RU | 2182341 C2 | 5/2002 | |
| RU | 2253127 | 5/2005 | |
| TW | 448304 B | 8/2001 | |
| WO | WO-9635958 A1 | 11/1996 | |
| WO | 9718485 A1 | 5/1997 | |
| WO | WO-9815150 A1 | 4/1998 | |
| WO | WO-9904743 | 9/1999 | |
| WO | 99054752 | 10/1999 | |
| WO | 0058748 A1 | 10/2000 | |
| WO | WO-2002052225 | 7/2002 | |
| WO | 02061450 | 8/2002 | |
| WO | 02071095 | 9/2002 | |

(56) References Cited

FOREIGN PATENT DOCUMENTS

| WO | WO-03092319 | 11/2003 |
|---|---|---|
| WO | WO-04036240 | 4/2004 |
| WO | WO-2004113948 | 12/2004 |
| WO | WO-2005004528 A1 | 1/2005 |
| WO | 2006005193 A1 | 1/2006 |
| WO | WO-2006029277 A1 | 3/2006 |
| WO | WO-2008016901 A2 | 2/2008 |
| WO | WO-2008019172 A2 | 2/2008 |

OTHER PUBLICATIONS

Buck T M, et al., "A High G, MEMS Based, Deeply Integrated, INS/GPS, Guidance, Navigation and Control Flight Management Unit" Position, Location, and Navigation Symposium, 2006 IEEE/ION Coronado, CA Apr. 25-27, 2006, Piscataway, NJ, USA,IEEE LNKDDOI: 10.1109/PLANS.2006.1650674, Apr. 25, 2006 (Apr. 25, 2006), pp. 772-794, XP010925000 ISBN: 978-0-7803-9454-4.
International Search Report and Written Opinion—PCT/US2011/038956—ISA/EPO—Jan. 22, 2013.
Lee H-W, et al., "Self-regulated GPS navigation processor" Signal Processing Systems, 1998. SIPS 98. 1998 IEEE Workshop on Cambridge, MA, USA Oct. 8-10, 1998, New York, NY, USA,IEEE, US LNKD—DOI:10.1109/SIPS.1998.715795, Oct. 8, 1998 (Oct. 8, 1998), pp. 327-336, XP010303693 ISBN: 978-0-7803-4997-1.
Mao et al., "Non-Linear GPS Models for Position Estimate Using Low-cost GPS Receiver", Intelligent Transportation Systems, Proceedings, IEEE, Oct. 12, 2003, vol. 1, pp. 637-642.
Montenbruck O, et al., "Reduced dynamic orbit determination using GPS code and carrier measurements" Aerospace Science and Technology, Elsevier Masson, FR LNKDD0I: 10.1016/J.AST.2005.01.003, vol. 9, No. 3, Apr. 1, 2005 (Apr. 1, 2005), pp. 261-271, XP025368000 ISSN: 1270-9638 [retrieved on Apr. 1, 2005] * Sections 2.5, 2.6 figure 2.
Schmid, et al.: "Combined Galileo/GPS Architecture for Enhanced Sensitivity Reception," AEU International Journal of Electronics and Communications, Elsevier, Jena, DE, vol. 59, No. 5, Jul. 15, 2005, pp. 297-306.
Willms B: "Space integrated GPS/INS (SIGI) navigation system for space shuttle" Digital Avionics Systems Conference, 1999. Proceedings. 18th St Louis, M0, USA Oct. 24-29, 1999, Piscataway, NJ, USA,IEEE, US, vol. B.5/12 pp. vol. 2, Oct. 24, 1999 (Oct. 24, 1999), pp. 4-1, XP010366370 ISBN: 978-0-7803-5749-5.
Wirola L., et al., "SUPL3 RD—Assistance data push ; OMA-LOC-2009-0173R02CR_SUPL3_RD_AssistanceData", XP064090104, Jun. 23, 2009, 3 pages.

\* cited by examiner

POSITION DETERMINATION USING MEASUREMENTS FROM PAST AND PRESENT EPOCHS

CLAIM OF PRIORITY

The present application for patent is a Continuation of patent application Ser. No. 12/792,548 entitled "POSITION DETERMINATION USING MEASUREMENTS FROM PAST AND PRESENT EPOCHS," filed Jun. 2, 2010. The disclosure of the prior application is hereby incorporated by reference herein in their entirety.

BACKGROUND

Field

The subject matter disclosed herein relates to positioning systems.

Information

A satellite positioning system (SPS), such as the Global Positioning System (GPS), Galileo, and Glonass, for example, typically provides position, velocity, and/or time information. In a particular implementation, an SPS may comprise an GNSS (Global Navigation Satellite System). A variety of receivers have been designed to decode signals transmitted from satellite vehicles (SV) of an SPS to determine position, velocity, and/or time. In general, to decipher such signals and compute a final position, a receiver may first acquire signals from SVs that are in view, measure and track the received signals, and recover navigational data from the signals. By accurately measuring distances or "pseudoranges" to multiple SVs, a receiver may triangulate its position, e.g., solving for a latitude, longitude, and/or altitude. In particular, the receiver may measure distance by measuring the time that signals take to travel from a respective SV to the receiver.

In certain locations, such as urban environments with tall buildings, a receiver may only be able to acquire signals from three or less SVs. In such situations, the receiver may be unable to resolve all four variables of a position solution that include latitude, longitude, altitude, and time. If signals from fewer than four SVs are available, the receiver may be unable to calculate its position based on an SPS alone. To address such a limitation, receivers may employ hybrid location technology that involves signals from base stations of a wireless communication system, for example. As with SV signals, hybrid receivers may measure time delays of wireless signals to measure distances to base stations of a network. Hybrid receivers may utilize signals from base stations as well as any acquired signals from SVs of an SPS, to resolve position and time variables. Such a hybrid positioning technique may allow a receiver to compute a position solution in a wide variety of locations where SPS-only positioning techniques may fail. In code division multiple access (CDMA) mobile wireless systems, for example, a base station measurement portion of a hybrid technique may include techniques such as Advanced Forward Link Trilateration (AFLT).

Accuracy of a position solution determined by a receiver may be affected by the degree of time precision within a positioning system. In synchronized systems, such as existing CDMA systems for example, timing information communicated by cellular base stations may be synchronized with timing information from SVs of an SPS, providing precise time throughout the system. In some systems, such as the Global System for Mobile Communications (GSM), timing information may not be synchronized between base stations and signals transmitted by SVs of an SPS. In such systems, Location Measurement Units (LMUs) may be added to an existing infrastructure to provide precise timing information for a wireless network.

A technique that may be used in position determining systems involves the use of Kalman filters. A Kalman filter (KF) may comprise a recursive data estimation algorithm for modeling attributes or states of moving entities such as aircraft, people, and vehicles, just to name a few examples. Such attributes or states may include velocity and/or position. A current state of a system and a current measurement may be used to estimate a new state of the system. A Kalman filter may combine available measurement data, prior knowledge about a system, measuring devices, and/or error statistics to produce an estimate of desired variables in such a manner that the error may be statistically minimized.

BRIEF DESCRIPTION OF THE FIGURES

Non-limiting and non-exhaustive features will be described with reference to the following figures, wherein like reference numerals refer to like parts throughout the various figures.

SUMMARY

Figure 1:
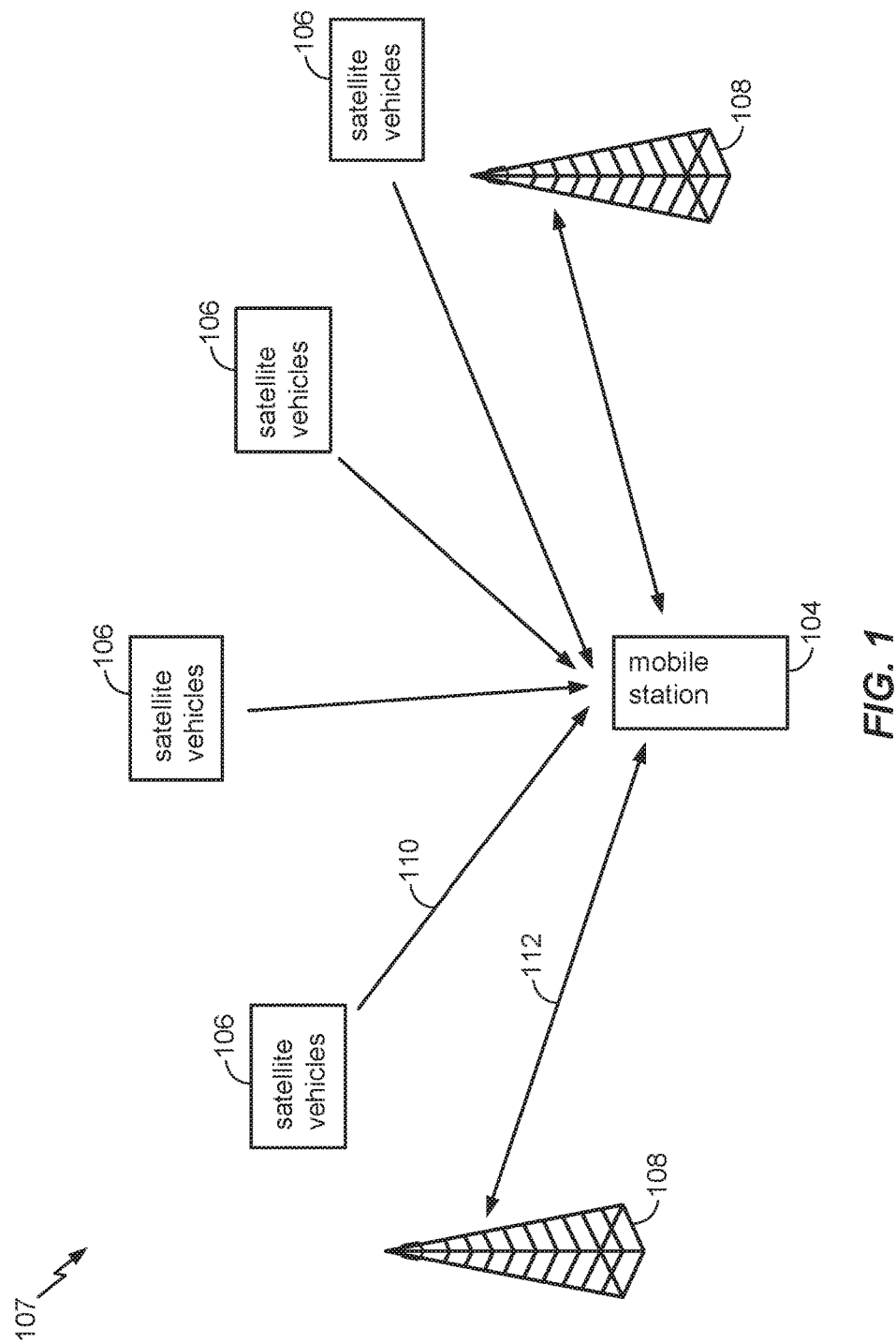
FIG. 1 illustrates an application of a satellite positioning system, according to an implementation.

In one particular implementation, a method may comprise storing a first portion of information acquired from one or more sources in a first epoch, wherein the stored first portion of information may include non-pseudorange measurements for at least one of the sources and is not sufficient to compute a navigation solution; and comprising obtaining a second portion of information subsequent to the first epoch, enabling use of the stored first portion of information in computing the navigation solution. It should be understood, however, that this is merely an example implementation and that claimed subject matter is not limited to this particular implementation.

DETAILED DESCRIPTION

Reference throughout this specification to "one example", "one feature", "an example" or "a feature" means that a particular feature, structure, or characteristic described in connection with the feature and/or example is included in at least one feature and/or example of claimed subject matter. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

A mobile station (MS), such as a cellular telephone, a personal digital assistant (PDA), a mobile receiver, and/or a wireless computer, just to name a few examples, may include a capability to determine its position using received SPS signals, such as provided by SPS and/or other global navigation satellite systems. In addition to an ability to receive signals from SVs of an SPS, an entity such as an MS may communicate with a wireless network, operated by a wireless service provider, for example, to request information and other resources. Such communication between an MS and a wireless network may be facilitated through any number of cellular base stations, cell towers, and/or transmitters, just to name a few examples. Each such base station, cell tower, and/or transmitter may provide communication for a respective coverage area or cell, for example. The term "cell" may refer to a transmitter and/or its coverage area. The term "transmitter" as used herein may refer to a transmission device located with a base station, a television transmitter, and/or a radio station, such as for the FM band, just to name a few examples. Communication between a wireless network and an MS may involve determining a location fix of the MS operating within the network: data received from the network may be beneficial or otherwise desired for such a location determination. Additionally, an MS may communicate and/or receive signals from landbased beacons such as a gateway, which may comprise a wired gateway, a wireless gateway, and/or wireless access point (WAP) that allows wireless communication devices to connect to a wireless network using Wi-Fi, RFID, Bluetooth™, and/or other technologies, for example. Such a WAP may connect to a wired network to relay information between wireless devices and wired devices on the network, for example. Of course, such descriptions of gateways and wireless access points are merely examples, and claimed subject matter is not so limited.

In an implementation, an MS may determine one or more measurements based at least in part on signals and/or information acquired during various cycles of its operation. Such measurements may be used to determine a navigation solution of the MS. In particular, a first portion of information acquired from one or more sources in a first epoch may not be sufficient to compute a navigation solution. For example, such a first portion of information may include non-pseudorange measurements for at least one of several SPS sources. In one context, "non-pseudorange measurements" means measurements of properties and/or quantities exclusive of measurements of pseudorange to a transmitter. It should be understood, however, that non-pseudorange measurements may include measurements of quantities and/or properties that may be used to derive a pseudorange measurement to a transmitter or associated pseudorange rate measurement, for example, though claimed subject matter is not so limited. Such non-pseudorange measurements may comprise, for example, measurements of pseudorange rate, pilot phases, code phase detections, received signal strength indicator (RSSI), and/or angle of arrival (AOA), just to name a few examples. In a particular example implementation, a first portion of information comprising non-pseudorange measurements may not provide an MS with sufficient information for the MS to compute a navigation solution. Accordingly, acquiring a second portion of information subsequent to a first epoch may enable use of the first portion of information in computing a navigation solution. Such a second portion of information may include ephemeris and time information associated with said one or more sources, a base station almanac associated with said one or more sources, and/or a Wi-Fi almanac associated with said one or more sources, just to name a few examples. Additionally, a second portion of information may further enable use of AFLT associated with said one or more sources. Computing a navigation solution based, at least in part, on such a first and second portion of information may be accomplished using one of many possible techniques such as AFLT (Advanced Forward Link Trilateration), OTDOA (Observed Time Difference of Arrival), E-OTD (Enhanced Observed Time Difference), Enhanced Cell ID, and so on. For example, an MS may measure base station pilots (e.g., a terrestrial network, WWAN, WLAN, and so on) to obtain and store measurement information (e.g., pilot ID, code phase, Doppler, carrier phase, received signal strength, and so on) while waiting for a second portion of information comprising an almanac of transmitter information (e.g., position) in order to compute a location solution.

In one implementation, subsequent to a first epoch, an MS may obtain additional measurements as a result of receiving new, additional information. Subsequently receiving such additional information, for example, may allow for the earlier-acquired information to result in improved accuracy of a navigation solution for the MS. For example, though an MS may receive enough information from SPS signals to detect time and/or ephemeris, such information may be augmented by missing carrier phase measurements and/or pseudorange rates to improve accuracy of a navigation solution. In another implementation, such additional information may allow determination of a navigation solution of an MS. For example, multiple correlation peaks may be detected during a coherent integration interval to detect a code phase of a received SPS signal. Additional information may be needed, however, to select a correlation peak to represent a detected code phase. Accordingly, subsequently received information may enable selection of such a correlation peak to represent a code phase. In yet another example, inertial sensor measurements acquired during a first epoch may be insufficient to determine a navigation solution until additional information from one or more SVs are available during a second epoch. Of course, such additional measurements and/or information are merely examples of information that may be useful to determine a navigation solution, and claimed subject matter is not so limited.

In another particular implementation, an MS may process information obtained in a first time period or epoch to obtain one or more measurements associated with the first time period. Such information may comprise any combination or subset of, for example, position (e.g., latitude, longitude, altitude); position uncertainty (e.g., error ellipse, Horizontal Estimated Probability of Error (HEPE)); velocity (e.g., speed, heading, vertical velocity); velocity uncertainty; time (e.g. absolute time stamp of position); time uncertainty; acceleration (e.g., in horizontal and vertical directions); and signal parameters such as signal strength and signal-to-noise ratio, which may be an indication of an environment category (e.g., outdoor/indoor). Such information may be provided by SPS signals from SVs, signals from one or more base-stations, and/or signals from land-based beacons. Such an MS may estimate and/or predict a state following the first time period based, at least in part, on the one or more measurements. Such a state may comprise a position and/or velocity of the MS, for example. In a particular implementation, an MS may estimate and/or predict a state using a Kalman filter. On the other hand, if the one or more measurements are not sufficient to estimate and/or predict a state following the first time period, then such measurements may be stored and later used with subsequently-acquired measurements that provide "missing" information. Accordingly, as time elapses, such an MS may obtain additional information subsequent to a first epoch. For example, such additional information may comprise ephemeris data received from a location server. Using such additional information, an MS may re-process at least a portion of stored information obtained in the first epoch to obtain one or more measurements that allow determination of a navigation solution for the MS, including a state associated with the MS. For example, such a state of an MS may provide real-time navigation solutions that comprise a position fix of the MS. Such a position fix may provide geographic information, such as latitude and longitude, a geographical map, and/or any information that conveys a location and/or position of an MS. A position fix may include relative location information such as a set off, wherein a location of a receiver or device, for example, may be provided in relation to another location. Such a set off may indicate a location of a receiver or device relative to a location of a landmark, a region, a marketplace, a cellular tower and/or transmitter, an airport, a second mobile station, and a previous location fix, just to name a few examples.

FIG. 1 illustrates an application of a satellite positioning system 107, according to an implementation. In particular, MS 104 may take the form of any one of a variety of mobile receivers capable of receiving navigation signals, such as satellite navigation signals 110 and/or wireless communication signals 112. Such signals, for example, may be transmitted from reference stations such as SVs 106 and/or from terrestrial locations such as land-based beacons or base stations 108. MS 104 may comprise a mobile phone, a handheld navigation receiver, and/or a receiver mounted within a vehicle, such as an airplane, automobile, truck, tank, ship, and/or the like. Base stations 108 may communicate with MS 104 in accordance with any one of a number of wireless communication protocols. One common wireless communication protocol is CDMA in which multiple communications are simultaneously conducted over a radio-frequency (RF) spectrum. In a CDMA environment, one technique for obtaining information for computing a navigation solution may include enhanced AFLT. Other examples include GSM, which may use narrowband Time Division Multiple Access (TDMA) for communicating data, and General Packet Radio Service (GPRS). In some implementations, MS 104 may integrate both a GPS receiver and a wireless communication device for voice and/or data communication. Thus, although the specific example of a GPS system may be described herein, such principles and techniques may be applicable to other satellite positioning systems or terrestrial positioning systems such as a wireless network.

MS 104 may employ techniques to compute a positioning solution based, at least in part, on signals 110 and/or signals 112 received from satellites 106 and base stations 108, respectively. MS 104 may acquire signals 110 from satellites 106 in view, and may measure distance from an individual satellite by measuring time for a signal to travel from the respective satellite to MS 104 to determine a pseudoranging measurement. Similarly, MS 104 may also receive signals 112 from base stations 108 of wireless communication system 107, and measure distances from base stations 108 based, at least in part, on time required for a wireless signal to travel from a base station to MS 104. Of course, such techniques to compute a positioning solution are merely examples, and claimed subject matter is not so limited.

Figure 2:
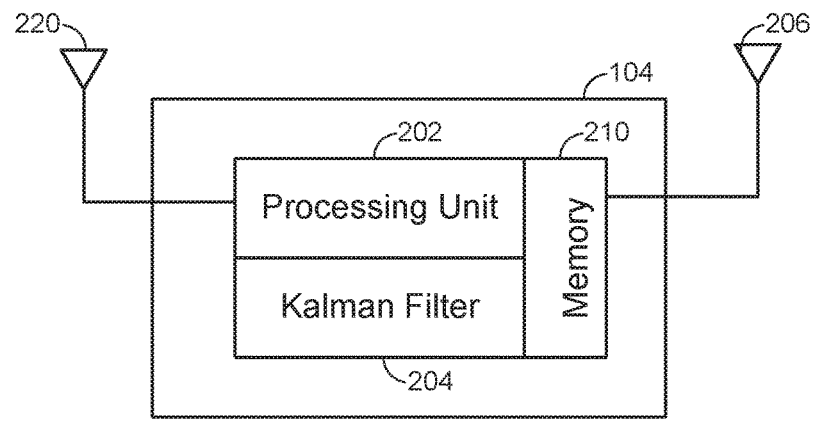
FIG. 2 is a schematic diagram of a device capable of communication with a wireless network, according to one implementation.

FIG. 2 is a schematic diagram of a device capable of communication with a wireless network, according to one implementation. In particular, a mobile device, such as MS 104 shown in FIG. 1 for example, may include an antenna 220 configured to receive signals from an SPS and an antenna 206 configured to receive signals from a terrestrial communications network. Such signals may be provided to a processing unit 202 that utilizes both software/firmware and hardware components to provide signal processing functionality with respect to the signals. For example, in one implementation, a Kalman filter 204 may be implemented as part of MS 104 to assist with position determining functions of MS 104. In another implementation, such a Kalman filter may be provided at a fixed station in communication with MS 104 at, for example, a location server in communication with MS 104 via a master switching center (MSC). Kalman filter 204 may receive input measurements and implement a process and/or technique to estimate values based, at least in part, on such input measurements and an historical state of the MS. A memory 210 may be utilized to store measurement information, state information, and/or covariance matrix values for Kalman filter 204 that may provide a measure of error, or certainty, of state estimates provided by Kalman filter 204. Of course, such details of a mobile station and a Kalman filter are merely examples, and claimed subject matter is not so limited.

As indicated above, signals received from SVs via antenna 220 may be decoded and processed into position information using various algorithms and/or techniques. For example, signals acquired from three SVs during a single measurement epoch may be used to generate a position fix that could then be used to initialize Kalman filter 204. Once Kalman filter 204 is initialized, position estimates based on later occurring SPS measurements may be determined. However, if acquired measurements during a first epoch are not sufficient to generate a position fix, then subsequently acquired information may enable generation of such a position fix.

As described, MS 104 may comprise a cellular telephone or similar mobile communications device. Accordingly, there may be additional functional blocks and/or devices that are part of MS 104 but are not shown in FIG. 2. Such additional blocks and/or devices may relate to processing signals received from antennas 206, 220, providing a user interface, providing speech communications, providing data communications, and/or other capabilities, just to name a few examples. Again, however, such details of a mobile station are merely examples, and claimed subject matter is not so limited.

Figure 3:
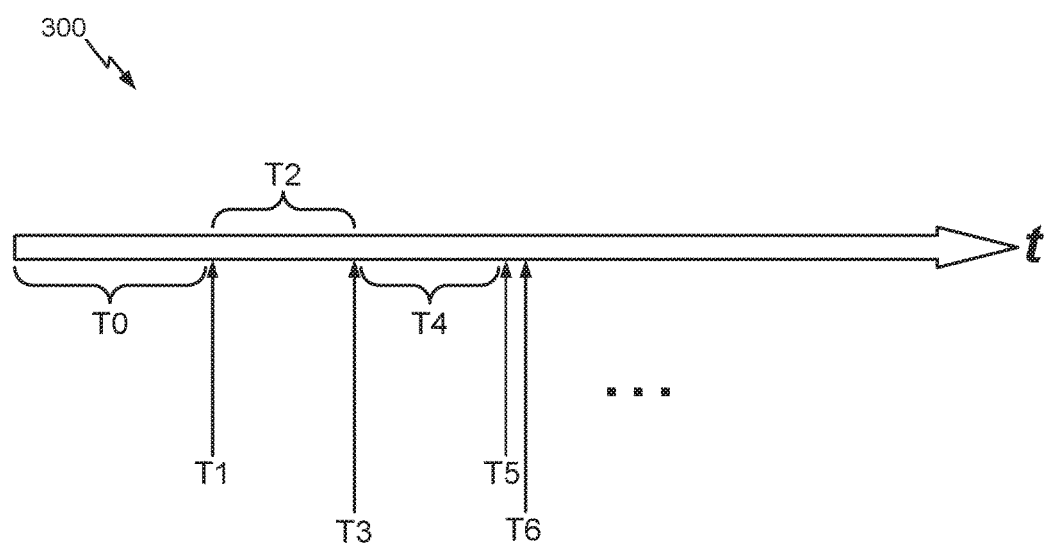
FIG. 3 is a diagram of a timeline involving a process to estimate and/or predict states of a system, according to an implementation.

FIG. 3 is a diagram of a timeline involving a process to determine a navigation solution of a system such as an MS, according to an implementation. As discussed, an MS may receive signals from transmitters located at SVs and/or terrestrial locations such as base stations, and/or land-based beacons, for example, during a first epoch or time period T0. Such signals may include information that an MS may use to determine one or more pseudoranges and/or pseudo Doppler information, for example. In a particular implementation, such signals may comprise non-pseudorange information such as inertial sensor data acquired from one or more sensors located at an MS. In another implementation, such signals may originate from terrestrial sources and may comprise non-pseudorange information such as pilot phase information, received signal strength indicator (RSSI), and/or angle of arrival (AOA), just to name a few examples. Though an MS may decode and/or process such signals into measurements, such measurements and/or information may not be sufficient to compute a navigation solution and/or state of the MS. By time T1, such measurements and/or information may be stored in a memory at the MS to be used in the future, as discussed in detail below. Meanwhile, in one particular implementation, during a waiting period T2, an MS may be ready and "searching" for additional information from SVs and/or land-based transmitters. In another particular implementation, however, which is discussed in detail below, an MS may be selectively disabled with respect to processing one or more measurements and or information during T0 and/or T1. Of course, such a timeline need not include separate time intervals T0 to T1 and T1 to T2, since SV and terrestrial measurement gathering may occur concurrently. For example, processes involving SPS measurements may be contingent on one set of such additional information (e.g., time and ephemeris), whereas processes involving terrestrial measurements may be contingent on another set of such additional information (e.g., base station almanac).

At time T3, additional information may become available to an MS. In one example, an additional SV may orbit into view of an MS, thus enabling the use of additional pseudoranging measurements, a more accurate SPS time, and/or Satellite Based Augmentation System (SBAS) correction information. In a second example, such an additional SV may become viewable by an MS due to a changing Radio Frequency (RF) environment, such as if the MS is moved from indoors to outdoors. In a third example, signals from base stations and/or land-based beacons may become receivable due to a changing RF environment or range to an MS. Such signals may provide carrier phase measurements, pseudorange rates, a base station almanac, a Wi-Fi almanac, SV ephemeris, and/or a wireless system time, just to name a few examples. Of course, these are merely examples of how additional information may become subsequently available to an MS, and claimed subject matter is not so limited.

As a consequence of one or more such events that occur at time T3, the MS may receive signals comprising additional information during a second epoch or time period T4. At time T5, in a particular implementation, such signals may then be decoded and/or processed by the MS to provide additional measurements, as described above for example. Of course, such decoding and/or processing may occur during second time period T4 as signals are received. In such a case, an MS may receive and subsequently decode and/or process such signals on-the-fly, or from time to time. However, claimed subject matter is not limited to such examples. The additional information may be used, for example, to provide additional measurements based at least in part on stored information acquired during first epoch T0. For example, additional information acquired during period T4 may be combined with information received during first epoch T0 to provide measurements that were not available prior to period T4.

As another example, additional information acquired during period T4 may be combined with information received during first epoch T0 to improve accuracy of measurements performed during first epoch T0 by enabling a determination and/or selection of poor quality information acquired during first epoch T0, such as noise and outliers, to be discarded. In this context, the term "outlier" refers to data comprising a data value that is spurious and/or relatively far-removed from its neighboring data, such as a spike in the data. At time T6, after at least a portion of additional signals acquired during period T4 are decoded and/or processed into additional subsequently acquired information, a navigation solution may be computed and/or determined based, at least in part, on stored information and the additional information. In other words, additional measurements acquired after a first epoch may be used to supplement information that is not itself sufficient to compute a navigation solution. Of course, such details regarding time periods, events, and order of such events are merely examples, and claimed subject matter is not so limited.

In a particular implementation, as mentioned above, an MS may be selectively disabled with respect to processing one or more measurements and or information during periods T0 and/or T1. For example, pseudo-range processing may be selectively disabled for one or more sources of information and/or signals, such as from SVs and/or land-based transmitters during a first epoch. Such selectively disabling MS processing may be performed by a user of an MS and/or by processing signals by one or more processing units, such as processing unit 202 shown in FIG. 2, for example. Such process disabling may provide benefits such as during periods of high multi-path signals, which may occur, for example, during urban driving conditions. In such a situation, signals from a single source may reflect multiple times from various interfaces, such as buildings and streets, before reaching an MS. Disabling processing of high multi-path signals may reduce signal and/or measurement noise that would otherwise be presented to a process to determine a navigation solution and possibly resulting in a failure of such a process or less accurate positioning, for example. Subsequent to a reduction of a multi-path situation for one or more sources, such as at time T3, an MS may be selectively enabled with respect to processing one or more measurements and or information during period T4. For example, pseudorange processing may be selectively enabled for one or more sources of information and/or signals, such as from SVs and/or land-based transmitters during time T4. Such selectively enabling MS processing may be performed by a user of an MS and/or by one or more processing units, such as processing unit 202 shown in FIG. 2, for example.

Figure 4:
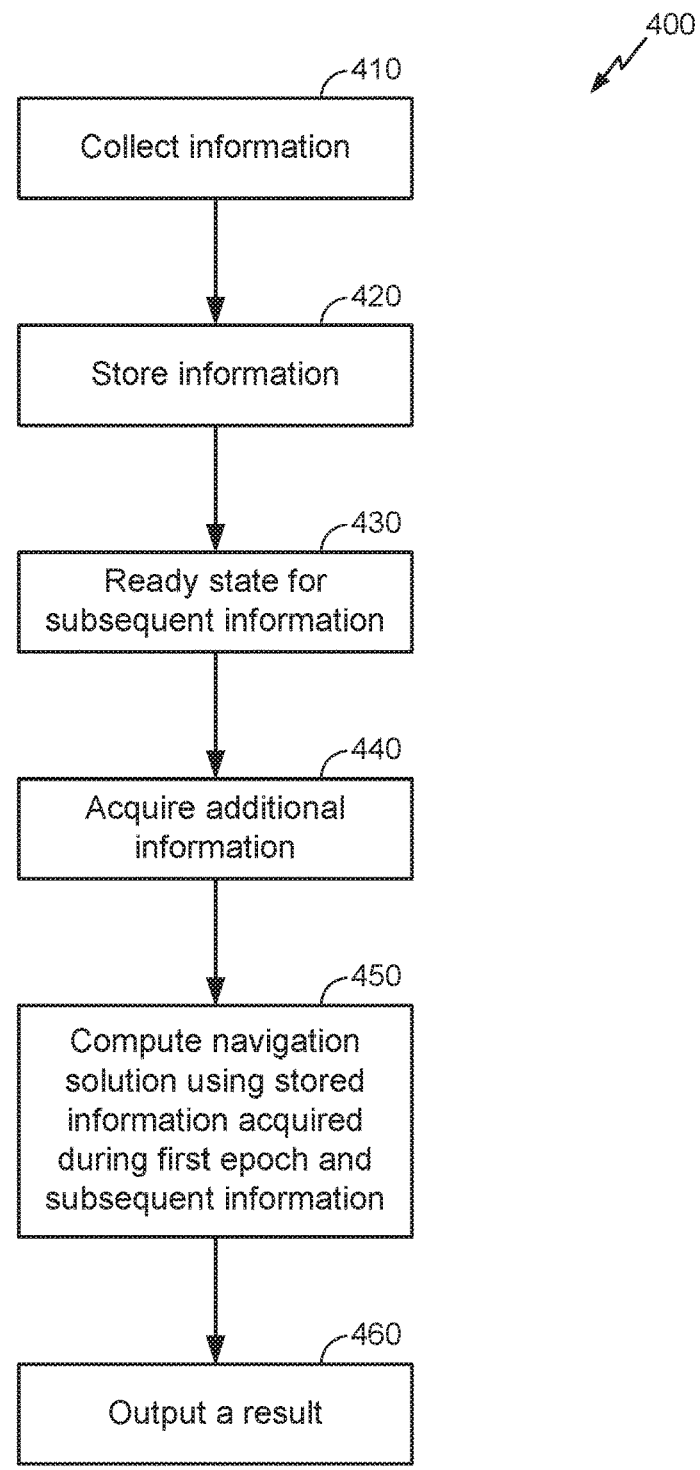
FIG. 4 is a flow diagram showing a process to determine a navigation solution, according to an implementation.

FIG. 4 is a flow diagram showing a process to determine a navigation solution, according to an implementation. At block 410, an MS may receive signals from SVs, base stations, land-based beacons, and/or other sources, for example, during a first time period or epoch. In one particular implementation, a base station may comprise a wireless access point to a network such as WWAN, WLAN, WPAN, and so on. At block 420, the MS may decode and/or process such signals into measurements, or information, which may be stored for later use. At block 430, the MS may be in a ready state to acquire additional information. For example, during such a ready state, an MS may be located in a relatively poor RF environment where the MS has difficulty receiving additional location-based information, and is waiting for an improved RF environment. Such additional information may comprise SPS time and ephemeris, a base station almanac (BSA), and/or a Wi-Fi almanac associated with one or more sources that provided signals during a first epoch. In one particular implementation, such a base station almanac may comprise a database with information regarding base station transmitters. Such information may include a unique identifier for a base station and a position of a transmitter, for example. Depending, at least in part, on positioning algorithms used, such a database may include additional information used to calculate a position solution. In one implementation, a BSA may include identifiers and/or position for individual transmitters. Such an identifier may comprise, for example, a unique MAC address for a Wi-Fi case or may be a cellular identifier in a WWAN case (e.g., SID+NID+BASEID for a CDMA sector). Such an identifier may comprise other parameters related to a transmitter that may be useful to aid in a location determination. For example, such parameters may comprise transmission angle, radius of coverage, timing of transmitter (if known), altitude of transmitter, various calibration parameters, and/or their uncertainties. For sectorized base stations (e.g., multiple antennas to transmit in different directions), the parameters mentioned above may be applied for individual sectors. The above parameters may also be stored for one or more frequencies that a transmitter employs. In one implementation, calibrations and/or transmission radii, for example, may be different from one another at different frequencies. Of course, such a non-exhaustive list of parameters is merely an example, and claimed subject matter is not so limited. At block 440, the MS may acquire such additional information, which may comprise signals from one or more sources listed above. At block 450, a navigation solution for the MS may be determined and/or computed using stored information acquired during first epoch and subsequently obtained additional information. At block 460, such a navigation solution, which may describe a state of the MS, may be output to a display or used in another navigation process. For example, in one particular implementation, a real-time navigation solution, such as one resulting from process 400 described above, may be provided to a map matching (MM) algorithm. Such an algorithm may involve values that represent a history of position and velocity of an MS compared to a road network around the estimated MS position. The location of the MS may then be placed on the most probable road, for example.

In another particular implementation, a process to determine a real-time navigation solution, such as process 400 described above, may include processing Inertial Navigation System (INS)/SPS data that is collected before INS initialization by an MS. Here, an MS may include an Inertial Measurement Unit (IMU) comprising one or more on-board accelerometers, gyros, and/or compasses, for example, to provide such INS data. After INS initialization, an orientation of the MS measured by the IMU may be tracked back to a start time to enable INS/SPS data from the start time to the present, for example. Such a process may provide navigation results up to the present, which may be useful and provide potentially improved estimates of navigation states.

In still another particular implementation, a process to determine a navigation solution, such as process 400 described above, may include processing INS data before a first available SPS fix. For example, if SPS pseudoranges, time, and/or ephemeris are not (sufficiently) available to an MS, a navigation solution may not be determinable until a first SPS fix is obtained, even if INS data is available. However, it may be possible to obtain a navigation solution by computing INS-based results backwards in time from the first full SPS/INS solution. In a particular implementation, an MS may receive INS measurements in a first epoch and may then store such measurements at least until the MS is able to determine a past position fix of where such measurements were taken. An MS may make such a determination, for example, after the MS receives additional positioning information, such as SPS pseudoranges, time, and/or ephemeris. Subsequently, an MS may then correlate such a past position fix with a recorded time when stored INS measurements were taken. Accordingly, from such a time and a determined starting location where INS measurements were taken, an MS may extrapolate a position from such a starting location, e.g., based, at least in part, on inertial sensor measurements.

In still another particular implementation, in a navigation solution, such as pedestrian navigation for example, one or more sensors, such as inertial sensors (compass, accelerometer, and so on), may provide a first portion of information to an MS. Such a first portion of information may also comprise one or more satellite positioning measurements, though claimed subject matter is not so limited. In another example, a first portion of information may comprise ambiguous yaw and/or azimuth position information that, e.g., may be resolved by including a second portion of information comprising SV ephemeris and/or a system time.

Figure 5:
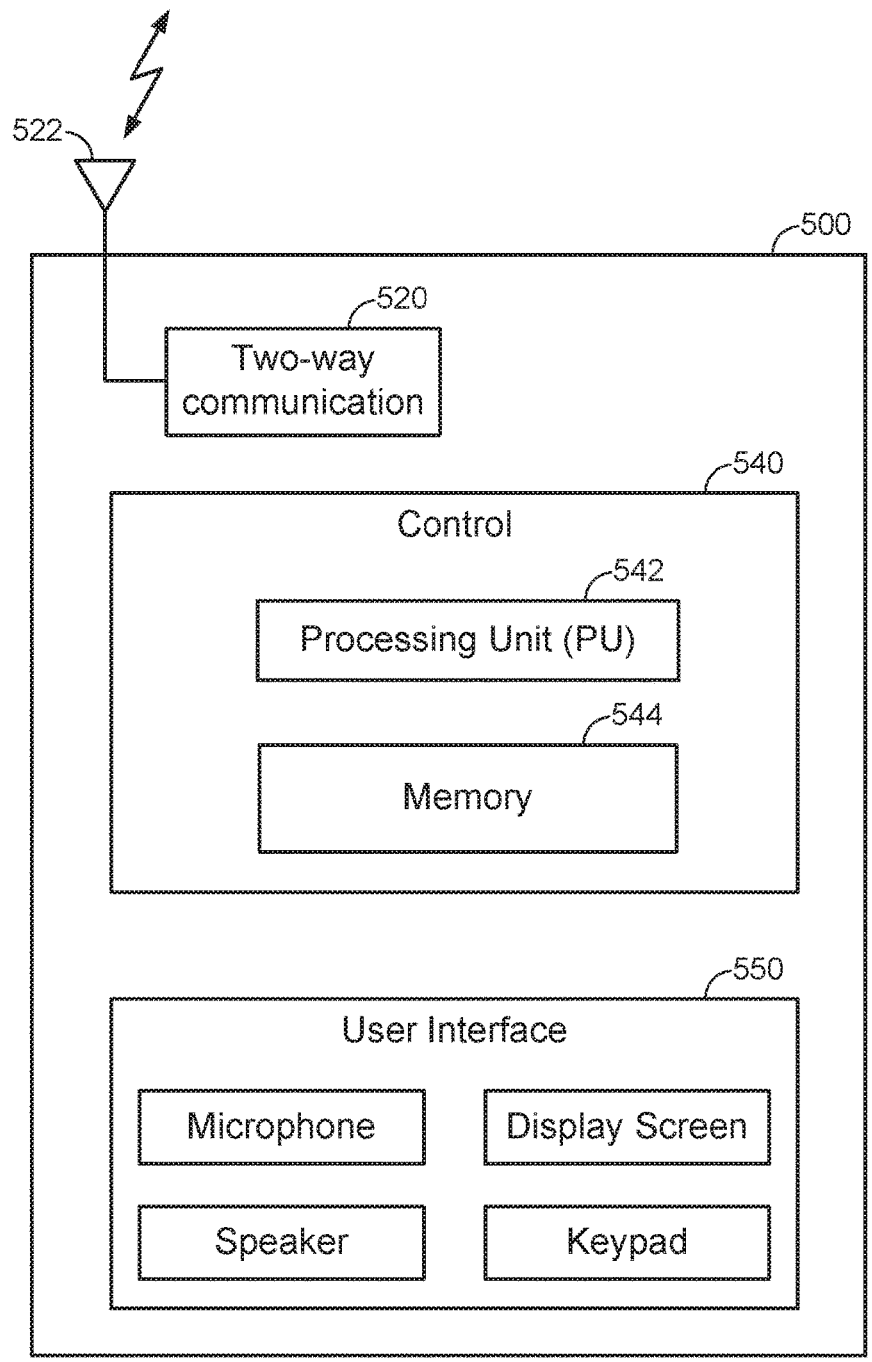
FIG. 5 is a schematic diagram of a device capable of communication with a wireless network, according to one implementation.

FIG. 5 is a schematic diagram of a device 500 capable of communication with a wireless network, according to one implementation. Such a device may comprise an MS, such as MS 104 shown in FIG. 1, for example. Device 500 may include a two-way communication system 520, such as but not limited to a cellular communication system, which may transmit and receive signals via antenna 522. The communication system 520 may include a modem adapted to process information for communication in one or more of the aforementioned networks. In one alternative implementation, device 500 may include a position location system, such as an SPS receiver to receive SPS signals. The modem and SPS receiver may communicate with one another, and such communication may include, for example, the cellular identification of the device, estimates of time and/or location, frequency, or other information. In another implementation, device 500 may not include a position location system, so that the device lacks any inherent ability to acquire SPS signals.

Control 540 may comprise a special purpose computing platform, such as a processing unit (PU) 542 and associated memory 544, supporting hardware, software, and firmware. For example, PU 542 may comprise processing unit 202 shown in FIG. 2. It will be understood as used herein that the PU 542 can, but need not necessarily include, one or more microprocessors, embedded processors, controllers, application specific integrated circuits (ASICs), digital signal processors (DSPs), and the like. The term PU is intended to describe the functions implemented by the system rather than specific hardware. In an alternative implementation memory 544 may include a look-up table. Memory 544 may store signals that represent machine-readable instructions which, if executed by PU 542, may enable device 500 to determine its location, as in at least the implementations described above.

According to an implementation, one or more portions of memory 544 may store signals representative of data and/or information as expressed by a particular state of memory 544. For example, an electronic signal representative of data and/or information may be "stored" in a portion of memory 544 by affecting or changing the state of such portions of memory 544 to represent data and/or information as binary information (e.g., ones and zeros). As such, in a particular implementation, such a change of state of the portion of memory to store a signal representative of data and/or information constitutes a transformation of memory 544 to a different state or thing.

Machine-readable instructions may be downloaded, e.g., received via two-way communication 520, from a remote entity such as a wireless carrier, for example. Machine-readable instructions may include an application that allows device 500 to identify and extract identification information of a cellular base station included in a pilot signal. Such an application may also include a look-up table of cellular base station information for a region or the world. Machine-readable instructions may also include a Kalman filter, as described above. Of course, claimed subject matter is not limited to these examples, which are only described here to help illustrate various implementations. Memory 544 may comprise one or more types of storage media. A user interface 550 may allow a user to enter and receive information, such as voice or data, into/from device 500. The user interface 550 may include, for example, a keypad, a display screen (e.g., a touch screen), a microphone, and a speaker.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other units designed to perform the functions described herein, and/or combinations thereof.

Some portions of the detailed description above are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, Glonass or Compass may transmit a signal marked with a PN code that is distinguishable from PN codes transmitted by other SVs in the constellation (e.g., using different PN codes for each satellite as in GPS or using the same code on different frequencies as in Glonass). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

To estimate a location at a receiver, a navigation system may determine pseudorange measurements to satellites "in view" of the receiver using well known techniques based, at least in part, e.g., on detections of PN codes in signals received from the satellites. Such pseudorange measurements to a satellite may be determined based, at least in part, e.g., on a code phase detected in a received signal marked with a PN code associated with the satellite during a process of acquiring the received signal at a receiver. To acquire the received signal, a navigation system typically correlates the received signal with a locally generated PN code associated with a satellite. For example, such a navigation system typically correlates such a received signal with multiple code and/or time shifted versions of such a locally generated PN code. Detection of a particular time and/or code shifted version yielding a correlation result with the highest signal power may indicate a code phase associated with the acquired signal for use in measuring pseudorange as discussed.

Upon detection of a code phase of a signal received from an SPS satellite, a receiver may form multiple pseudorange hypotheses. For example, before GPS bit synchronization is performed for a channel, there may be 20 possible pseudorange candidates with a 1 millisecond increment. Tracking and/or processing GPS signals from this SV, or using other information, may allow a reduction of the number of candidates to just one. Alternatively, additional information may lead to elimination of pseudorange hypotheses if a signal acquisition was proved to be false. In other words, using additional information, a receiver may eliminate such pseudorange hypotheses to, in effect, reduce an ambiguity associated with a true pseudorange measurement. With sufficient accuracy in knowledge of timing of a signal received from an SPS satellite, some or all false pseudorange hypotheses may be eliminated.

An SV as referred to herein relates to an object that is capable of transmitting signals to receivers on the Earth's surface. In one particular example, such an SV may comprise a geostationary satellite. Alternatively, an SV may comprise a satellite traveling in an orbit and moving relative to a stationary location on the Earth. However, these are merely examples of SVs and claimed subject matter is not limited in these respects.

As used herein, a mobile station (MS) refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Location determination and/or estimation techniques described herein may be used for various wireless communication networks such as a wireless wide area network (WWAN), a wireless local area network (WLAN), a wireless personal area network (WPAN), and so on. The term "network" and "system" may be used interchangeably herein. A WWAN may comprise a CDMA network, a TDMA network, an FDMA network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as CDMA2000, Wideband-CDMA (W-CDMA), to name just a few radio technologies. Here, CDMA2000 may include technologies implemented according to IS-95, IS-2000, and IS-856 standards. A TDMA network may implement GSM, Digital Advanced Mobile Phone System (D-AMPS), or some other RAT. GSM and W-CDMA are described in documents from a consortium named "3rd Generation Partnership Project" (3GPP). CDMA2000 is described in documents from a consortium named "3rd Generation Partnership Project 2" (3GPP2). 3GPP and 3GPP2 documents are publicly available. A WLAN may comprise an IEEE 802.11x network, and a WPAN may comprise a Bluetoot™ network, an IEEE 802.15x, for example. Such location determination techniques described herein may also be used for any combination of WWAN, WLAN, and/or WPAN.

Techniques described herein may be used with any one of several SPS satellites and/or combinations of SPS satellites. Furthermore, such techniques may be used with location determination systems that utilize pseudolites or a combination of satellites and pseudolites. Pseudolites may comprise ground-based transmitters that broadcast a PN code or other ranging code (e.g., similar to a GPS or CDMA cellular signal) modulated on an L-band (or other frequency) carrier signal, which may be synchronized with time. Such a transmitter may be assigned a unique PN code so as to permit identification by a remote receiver. Pseudolites may be useful in situations where GPS signals from an orbiting satellite might be unavailable, such as in tunnels, mines, buildings, urban canyons or other enclosed areas. Another implementation of pseudolites is known as radio-beacons. The term "satellite", as used herein, is intended to include pseudolites, equivalents of pseudolites, and possibly others. The term "SPS signals", as used herein, is intended to include SPS-like signals from pseudolites or equivalents of pseudolites.

For an implementation involving firmware and/or software, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processing unit. Memory may be implemented within the processing unit or external to the processing unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data are configured to cause one or more processing units to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for determining and implementing a navigation solution for a mobile device comprising:
obtaining, by one or more processors of the mobile device, during a first epoch, a first set of data from one or more sources;
determining, by the one or more processors, based on the first set of data, a first portion of information, wherein the first portion of information includes non-pseudorange measurements for at least one of the one or more sources;
determining, based on one or more criteria, that the one or more non-pseudorange measurements are not sufficient to compute a navigation solution;
responsive to determining that the one or more non-pseudorange measurements are not sufficient to compute the navigation solution, monitoring for additional set of data to compute the navigation solution;
receiving, by the one or more processors, at a time subsequent to the first epoch, a second set of data from the one or more sources;
determining, by the one or more processors, a second portion of information, the second portion of information from the second set of data comprising position information for the at least one source of the one or more sources;
determining, by the one or more processors and based on the one or more criteria, that the non-pseudorange measurements and the second portion of information are sufficient to compute the navigation solution;
in response to determining that the first portion of the information and the second portion of the information are sufficient to compute the navigation solution, determining the navigation solution; and
outputting, with the mobile device, an indication of the navigation solution.

2. The method of claim 1, wherein the second portion of information comprises a base station almanac (BSA) associated with the at least one source of the one or more sources.

3. The method of claim 1, wherein the second portion of information comprises ephemeris and time information of the at least one source of the one or more sources.

4. The method of claim 3, wherein the first portion of information comprises pseudorange and pseudorange rate measurements.

5. The method of claim 3, wherein the first portion of information comprises pseudorange and carrier phase measurements.

6. The method of claim 2, wherein the first portion of information comprises pilot phases.

7. The method of claim 2, wherein the first portion of information comprises a received signal strength indicator (RSSI).

8. The method of claim 2, wherein the first portion of information comprises an angle of arrival (AOA).

9. The method of claim 2, wherein the first portion of information comprises pseudorange rate measurements.

10. The method of claim 2, wherein the first portion of information comprises carrier phase measurements.

11. The method of claim 3, further comprising:
computing pseudorange measurements based, at least in part, on the ephemeris and time information, and on the stored first portion; and
computing the navigation solution based, at least in part, on the computed pseudorange measurements and the non-pseudorange measurements.

12. The method of claim 1, wherein the first portion of information comprises code phase detections.

13. The method of claim 1, wherein the one or more sources comprise satellite vehicles.

14. The method of claim 1, wherein the navigation solution comprises a position fix of a mobile receiver.

15. The method of claim 1, further comprising
disabling pseudo-range processing for at least one of the one or more sources during the first epoch; and
enabling the pseudo-range processing for the at least one of the one or more sources subsequent to the first epoch.

16. The method of claim 1, wherein the second portion of information comprises position information of the one or more sources that are not in view, by the mobile device, during the first epoch.

17. An apparatus comprising:
one or more receivers;
one or more processors coupled to the one or more receivers, the one or more processors configured to:
obtain, via the one or more receivers, during a first epoch, a first set of data from one or more sources;
determine, based on the first set of data, a first portion of information, wherein the first portion of information includes non-pseudorange measurements for at least one of the one or more sources;
determine, based on one or more criteria, that the one or more non-pseudorange measurements are not sufficient to compute a navigation solution;
responsive to determining that the one or more non-pseudorange measurements are not sufficient to compute the navigation solution, monitor for additional set of data to compute the navigation solution;
receive, at a time subsequent to the first epoch, a second set of data from the one or more sources;
determine a second portion of information from the second set of data, the second portion of information comprising position information for the at least one source of the one or more sources;
determine, based on the one or more criteria, that the non-pseudorange measurements and the second portion of information are sufficient to compute the navigation solution;
in response to determining that the first portion of the information and the second portion of the information are sufficient to compute the navigation solution, determine the navigation solution; and
output an indication of the navigation solution.

18. The apparatus of claim 17, wherein the obtaining the second set of data is in response to a changed signal environment and/or a changed view to the one or more sources.

19. An apparatus comprising:
means for obtaining, during a first epoch, a first set of wireless signals from one or more sources;
means for determining, based on the first set of wireless signals, a first portion of information, wherein the first portion of information includes non-pseudorange measurements for at least one of the one or more sources;
means for determining, based on one or more criteria, that the one or more non-pseudorange measurements are insufficient to compute a navigation solution;
means for responsive to determining that the one or more non-pseudorange measurements are not sufficient to compute the navigation solution, monitoring for additional set of signals to compute the navigation solution;

means for receiving, at a time subsequent to the first epoch, a second set of wireless signals from the one or more sources;

means for determining a second portion of information from the second set of wireless signals, the second portion of information comprising position information for the at least one source of the one or more sources;

means for determining, based on the one or more criteria, that the non-pseudorange measurements and the second portion of information are sufficient to compute the navigation solution;

means for, in response to determining that the first portion of the information and the second portion of the information are sufficient to compute the navigation solution, determining the navigation solution; and means for outputting an indication of the navigation solution.

20. A non-transitory computer-readable medium comprising instructions which, when executed by one or more processors, configure the one or more processors to:

obtain, via the one or more receivers, during a first epoch, a first set of data from one or more sources;

determine, based on the first set of data, a first portion of information, wherein the first portion of information includes non-pseudorange measurements for at least one of the one or more sources;

determine, based on one or more criteria, that the one or more non-pseudorange measurements are not sufficient to compute a navigation solution;

responsive to determining that the one or more non-pseudorange measurements are not sufficient to compute the navigation solution, monitor for additional set of data to compute the navigation solution;

receive, at a time subsequent to the first epoch, a second set of data from the one or more sources;

determine a second portion of information from the second set of data, the second portion of information comprising position information for the at least one source of the one or more sources;

determine, based on the one or more criteria, that the non-pseudorange measurements and the second portion of information are sufficient to compute the navigation solution;

in response to determining that the first portion of the information and the second portion of the information are sufficient to compute the navigation solution, determine the navigation solution; and output an indication of the navigation solution.

21. The method of claim 1, wherein the outputting the indication of the navigation solution comprises:

causing a display of the mobile device to show the indication of the navigation solution, outputting the indication of the navigation solution to a navigation process executed by the mobile device, or any combination thereof.

22. The method of claim 1, wherein the first portion of information comprise position fix information from the one or more sources;

wherein the second portion of information comprise satellite positioning system (SPS) measurements from the one or more sources; and wherein the navigation solution is computed based on initializing a Kalman filter with the position fix information and processing the SPS measurements using the initialized Kalman filter.

23. The method of claim 1, wherein the determining that the first portion of the information and the second portion of the information are sufficient to compute the navigation solution, comprises:

determining pseudorange measurements from the non-pseudorange measurements in the first portion of information based on the second portion of the information; and determining whether the pseudorange measurements are sufficient to compute the navigation solution.

* * * * *